United States Patent [19]

Turner et al.

[11] Patent Number: 5,584,981
[45] Date of Patent: Dec. 17, 1996

[54] ELECTROCHEMICAL DEIONIZATION

[75] Inventors: Andrew D. Turner, Abingdon; Christopher P. Jones, Swindon; Mark D. Neville, Stanford-in-the-Vale; Michael R. H. Hill, Wantage, all of United Kingdom

[73] Assignee: United Kingdom Atomic Energy Authority, Harwell, United Kingdom

[21] Appl. No.: 426,978

[22] Filed: Apr. 24, 1995

[30] Foreign Application Priority Data

| May 6, 1994 | [GB] | United Kingdom | 9409194 |
| May 20, 1994 | [GB] | United Kingdom | 9410272 |
| Jan. 26, 1995 | [GB] | United Kingdom | 9501536 |

[51] Int. Cl.$^6$ .................... B01D 61/48; C02F 1/469
[52] U.S. Cl. .................... 204/536; 204/551; 204/632; 204/647
[58] Field of Search .................... 204/182.4, 182.5, 204/301, 536, 551, 632, 647

[56] References Cited

U.S. PATENT DOCUMENTS

| 2,815,320 | 10/1953 | Kollsman | 204/182.4 |
| 3,149,061 | 9/1964 | Parsi | 204/182.4 |
| 3,291,713 | 12/1966 | Parsi | 204/182.4 |
| 3,296,111 | 1/1967 | Miller et al. | 204/182.4 |
| 3,485,737 | 12/1969 | Kakihana et al. | 204/182.4 |
| 3,645,884 | 2/1972 | Gilliland | 204/182.4 |
| 3,686,089 | 8/1972 | Korngold et al. | 204/182.4 |
| 3,869,376 | 3/1975 | Tejeda | 204/182.4 |
| 4,832,803 | 5/1989 | Vennesland | 204/182.4 |
| B1 4,632,745 | 6/1994 | Giuffrida | 204/182.4 |

FOREIGN PATENT DOCUMENTS

| 0170895 | 2/1986 | European Pat. Off. . |
| 0219968 | 4/1987 | European Pat. Off. . |
| 0503651 | 9/1992 | European Pat. Off. . |
| 0621072 | 10/1994 | European Pat. Off. . |
| 776469 | 6/1957 | United Kingdom . |
| 1019507 | 2/1966 | United Kingdom . |
| 1240710 | 7/1971 | United Kingdom . |
| 2240551 | 8/1991 | United Kingdom . |

*Primary Examiner*—Arun S. Phasge
*Attorney, Agent, or Firm*—William R. Hinds

[57] ABSTRACT

An electrochemical cell (50) for deionizsation utilizes electrochemical ion-exchange to remove ions from a feed solution. Under the influence of an electric field, ions are adsorbed into, are scored within and pass through a permeable layer (54, 64) of particulate ion-absorbing material and binder, the sheet being several millimeters thick. Water from the feed solution also permeates through the layer (54, 64), so a concentrated solution of the ions emerges from the rear (58) of the layer. The cell does not require separate sources of feed and eluant solutions and can be operated substantially continuously. In a modified cell (70) the flow path for the feed solution passes through a highly porous ion exchanger structure (77), which may be located between two such microporous layers (54, 64). Absorption in such a cell may be effective in the absence of an electric field, elution requiring the periodic application of the electric field.

17 Claims, 5 Drawing Sheets

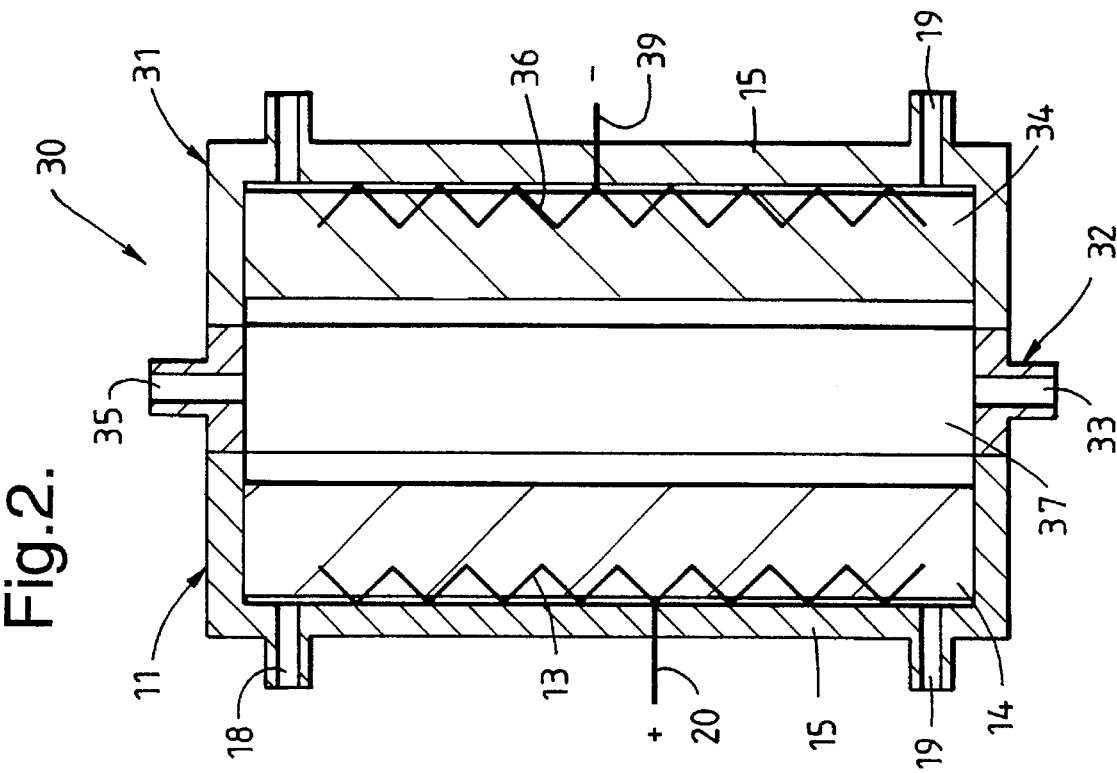
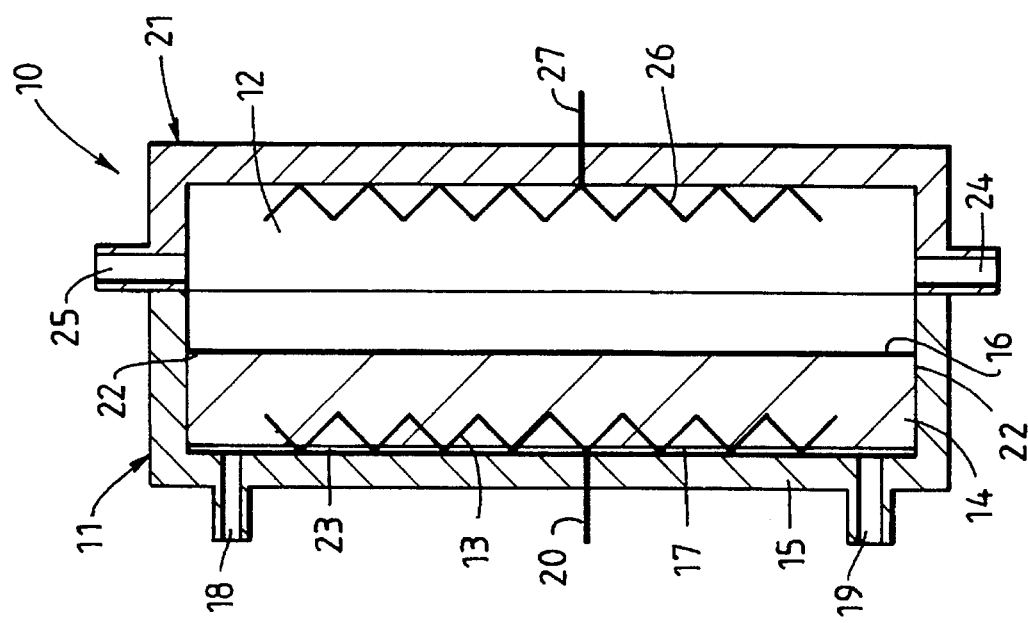

ELECTROCHEMICAL DEIONIZATION

This invention relates to an electrochemical cell for use in electrochemical deionisation and a method for electrochemical deionisation. More specifically, though not exclusively, it relates to an electrochemical cell suitable for continuous operation when used for electrochemical deionisation and a method for electrochemical deionisation.

One method for the electrochemical removal of ions from aqueous solutions and onto ion exchange materials may be referred to as electrochemical ion exchange or electrochemical deionisation; the method is described for example in UK patents GB 2 187 761 B, GB 2 240 551 B, GB 2 244 281 B and GB 2 244 282 B. It involves establishing an electrochemical cell comprising an aqueous solution as electrolyte, a working electrode and a counter electrode, where at least the working electrode incorporates an ion absorbing material such as an ion exchange resin in particulate form with a binder, and applying a d.c. voltage between the electrodes. For example, to remove cations from an aqueous solution, the working electrode incorporates a cation responsive ion exchange material and is made the cathode. One view of the mechanism is that at the electrode hydroxyl ions are generated by electrolysis of water, locally changing the pH, and the hydroxyl ions in turn produce active sites in the ion exchange material for absorption of cations from the aqueous solution; an alternative view of the mechanism is that hydrogen ions are displaced from the ion exchange material by cations from the aqueous solution, and migrate through the ion exchange material to the vicinity of the electrode where they are discharged. Subsequent reversal of the voltage enables the absorbed ions to be eluted so that the working electrode can readily be regenerated. The working electrodes are permeable.

Another method for the electrochemical removal of ions from an aqueous solution is that which is commonly known as electrodialysis. Electrodialysis is a technique which does not utilise electrode reactions and is an ion transport process which uses ion selective membranes which are substantially impermeable to water. The electrodes, in electrodialysis, merely apply the electric field necessary to induce ion transport across the membranes. The membranes used in electrodialysis are typically used in pairs of anion and cation selective membranes and several such pairs of membranes can be arranged in a stack between a single pair of electrodes; they have a thickness which is typically in the range 0.15 to 0.6 mm. Very little water passes through the membranes, which are continuous homogeneous films; substantially the only water transferred is the water of hydration of the ions, and typically 100–200 cm$^3$ of water is transferred per gram equivalent of ions. The ion selective membranes are not intended to store ions.

According to the present invention there is provided an electrochemical cell for use in electrochemical deionisation which comprises a water-permeable layer of particulate ion absorbing material, a liquid compartment for a liquid undergoing treatment arranged so the liquid comes into contact with at least part of the layer, electrodes to apply an electric field across at least part of the layer so that ions move through the layer to emerge into an eluate zone, the layer being at least 1 mm thick in the direction of the electric field, and the particulate material being bound together by a binder so as to be coherent at least in the direction of the electric field, and means to ensure separation of the liquid undergoing treatment from the eluate zone.

In a first arrangement the layer itself, although water permeable, provides sufficient separation between the eluate zone and the liquid. In this case the layer is exposed to the liquid over its front face and to the eluate zone over its rear face; seals may be required at edges of the layer.

In a second arrangement the layer itself is much more permeable, and so is exposed to the liquid throughout its thickness. In this case a separate barrier layer may be required between the eluate zone and the liquid, and this barrier layer may be a layer of ion absorbing material as discussed above, or alternatively an electrodialysis membrane. The layer itself may occupy the liquid compartment, and might be for example a macroporous structure such as a polyurethane gas filter foam (of density about 25 kg/m$^3$) coated with the ion absorbing material.

The particulate material is typically of particle size between 50 and 500 µm, preferably about 100 µm. Alternatively it might comprise larger particles for example 0.5 to 4 mm in diameter, with smaller particles in the interstices between the larger particles. The thickness of the layer might be as much as 100 mm but is more typically no more than 25 mm thick, for example in the range 4 to 8 mm. The thicker the layer, the larger is its storage capacity for ions, and for some purposes a large storage capacity is advantageous. However a thicker layer will offer a larger electrical resistance, and so will raise the electrical power requirements of the cell. The binder holds the particles together but does not fill the interstices; a layer for use in the first arrangement typically has a permeability to water in the range 10 to 200 liters m$^{-2}$h$^{-1}$, more usually in the range 25 to 130 liters m$^{-2}$h$^{-1}$, for example about 60 liters m$^{-2}$h$^{-1}$ (the pressure head in these cases being that in an operating cell, and so less than 1 m of water).

The present invention also provides a method for the removal of ions from an aqueous liquid which comprises establishing an electrochemical cell by causing the aqueous liquid, as cell electrolyte, to be present in the liquid compartment of such a cell, whilst applying a d.c. voltage between the electrodes such that ions are adsorbed into the layer, are stored within the layer, are transported through the layer, and are subsequently eluted from the layer into the eluate zone. If the separation means is water-permeable then at the same time water from the electrolyte passes through the separation means into the eluate zone, so producing in the eluate zone an eluate solution.

The electrochemical cell and its method of use enable ions to be removed from an aqueous solution, to be stored within the cell and to be removed from the cell as a concentrated solution, without the need, as in conventional electrochemical ion exchange, for the reversal of polarity of the electrodes in the cell and elution back into the solution compartment. In some uses however one or more ionic species are selectively stored in the absorbing layer, and do not emerge into the eluate solution. Thus the cell may be operated in a substantially continuous fashion. In addition the electrochemical cell requires only one feed solution for continuous operation, unlike electrodialysis.

One electrode may comprise a current feeder embedded within the ion absorbing layer. In this case the current feeder must be such that the combination of the feeder and the ion absorbing layer is permeable. Preferably in this case the ion absorbing material provides a uniformly thin layer on the rear surface of the feeder, preferably less than 0.5 mm, and a uniformly thicker layer on the front surface. Alternatively the current feeder may be in contact with the rear surface of the ion absorbing layer, or may be slightly separated from the rear surface of the ion absorbing layer. In the latter case the rear surface of the ion absorbing layer, and a housing, together define an elution compartment which in use is filled with liquid, and the housing also defines an outlet port from the elution compartment. This outlet port may be provided with a valve.

When the electrode current feeder is in intimate contact with the ion absorbing layer the electrode assembly may be made by coating the current feeder with an intimate mixture of an ion absorbing material and a solution of a binder in a suitable solvent (e.g. butadiene/styrene copolymer elastomer dissolved in 1,1,1 trichloroethane) and drying to give a current feeder/membrane composite electrode which may then be sealed around its edges to an assembly housing which has an outlet port. Such a composite electrode may be made in situ using a housing as a mould, and then sealed at its edges to the housing.

The rear face of the ion absorbing layer may be adjacent to an internal surface of a housing such that there is a small gap of 0.1 mm or more between the rear surface of the layer and the housing. If the electrode current feeder is not embedded in the layer this gap must be large enough to accommodate the electrode current feeder and therefore will typically be greater than 1 mm. This gap defines the elution compartment. The ion absorber layer may be sealed to the housing by any suitable means including for example the use of adhesive bonding or the use of gaskets.

The ion absorber layer may have a range of different shapes. It may be a flat sheet. Alternatively it may be a cylindrical tube. It may form a continuous belt which is gradually fed through the cell. Furthermore it may be made by a variety of different processes such as solvent casting (as mentioned above), extrusion, hot pressing, or rolling. In every case the layer is itself water-permeable. The front and rear surfaces are usually smooth, but in some situations may instead be corrugated, or shaped to form longitudinal rectangular channels.

Subject to the appropriate choice of materials and operating conditions the electrochemical cell of the invention may be used for the removal of cations or anions or both. If only anions (or cations) are to be removed, the second electrode is merely a counter electrode. When both anions and cations are to be removed simultaneously the second electrode may also be an electrode assembly as discussed above, incorporating a suitable ion absorbing material. Alternatively there may be two electrode assemblies and two counter electrodes, one pair of electrodes being used to remove cations the other to remove anions. In this case the two counter electrodes may be replaced by a common electrode, and such a common counter electrode need not be electrically connected to either of the electrode assemblies.

The electrochemical cell housing may be made from any suitable material; a suitable material is polymethylmethacrylate.

The electrodes may for example be an amorphous carbon felt or a graphite felt or a metal mesh of, for example stainless steel, platinised titanium, nickel or platinum. Other suitable materials are iridium and tantalum oxide-coated titanium; and electrically conductive titania. The ion absorbing material may, for example be an ion exchange material such as those known in the art, for example AMBERLITE (Registered Trade Mark) IRC 50 and 84, which are weakly acidic cation resins, or IRN 78, which is a nuclear grade strongly basic anion resin (ex Rohm and Haas), or zirconium phosphate (ex Magnesium Elektron). Where selectivity to particular ions is required, other ion absorbing materials may be used, for example ferric ions or lanthanum ions absorbed onto amino-phosphonic acid ion exchange resins may be used to absorb arsenate or selenate ions selectively, while barium sulphate may be used to absorb radium ions selectively. The intimate mixture of binder and ion absorbing material may also include electrically conducting material such as graphite in finely divided form. Inert reinforcing fibres, for example glass fibres, may also be incorporated. The binder is preferably an adhesive elastomer.

If during continuous operation there is an irreversible adsorption of ionic material into the ion absorbing layer or layers then this may in some cases be removed by polarity reversal, or in some cases by addition of chemicals to change the pH in the solution compartment and/or the elution compartment. Advantageously this may be undertaken during maintenance periods, during start up periods prior to use or after extended use. This may if necessary also be undertaken during continuous use. It is not necessary for such a polarity reversal to result in elution from the layer into the solution compartment as would be the case in the conventional use of electrochemical ion exchange; it is only necessary that it be sufficient to overcome the irreversible adsorption of ionic material into the layer.

BRIEF DESCRIPTION OF THE DRAWINGS

The invention will now be further described by way of example only, and with reference to the accompanying drawings and examples in which:

FIG. 1 shows a sectional view of an electrochemical cell of the invention with a single electrode assembly;

FIG. 2 shows a sectional view of a modification of the electrochemical cell of FIG. 1 wherein both the cathode and anode are electrode assemblies;

Referring to FIG. 1 there is shown an electrochemical cell 10 comprising an electrode assembly 11 and a housing 21 attached to each other to define a solution compartment 12. The electrode assembly 11 comprises a platinised titanium mesh electrode current feeder 13 which is in contact with an electrode contact 20 and which is embedded in a permeable layer 14 of ion absorbing material formed from an intimate mixture of a particulate ion exchange resin and an elastomeric binder and located within an assembly housing 15; the layer has front and rear surfaces 16 and 17. The ion exchange layer 14 is sealed by adhesive sealant to the assembly housing 15 at its edges 22. The rear surface 17 of the membrane 14 is adjacent to a wall of the housing 15 in which are a vent 18 and an elution port 19 but there is a gap 23 about 0.1 mm wide between the rear surface 17 and that wall of the assembly housing 15. The housing 21 defines a solution inlet 24, and a solution outlet 25, and encloses a counter electrode 26 which is in contact with an electrode contact 27.

Example 1

Figure 3:
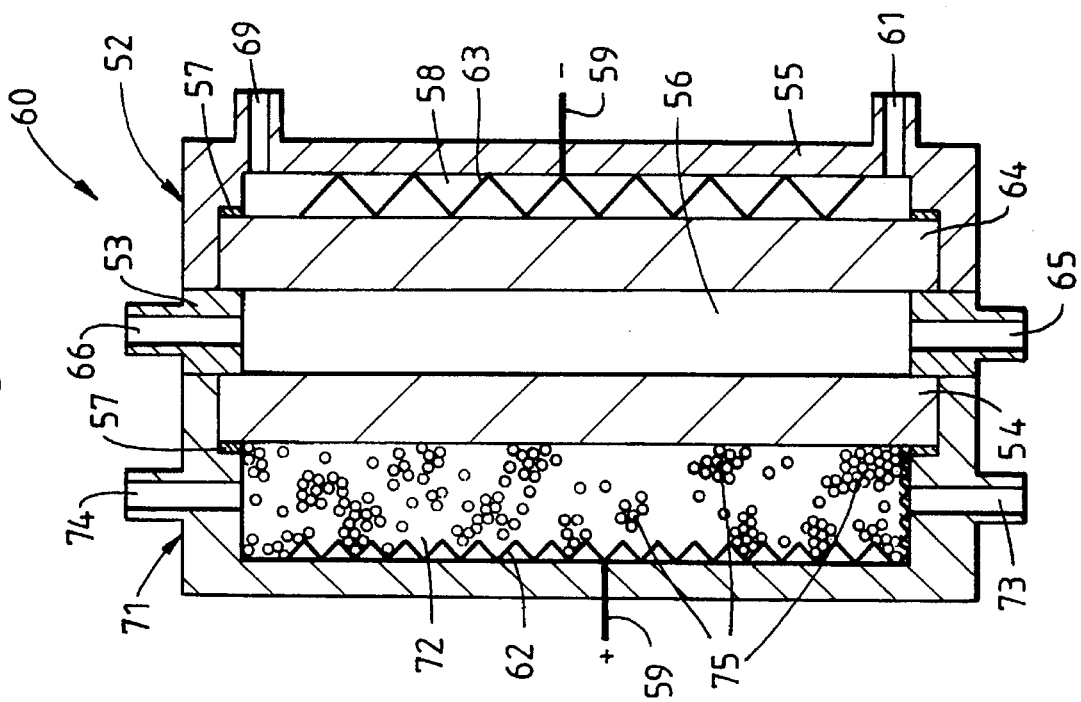
FIG. 3 shows a sectional view of an alternative electrochemical cell wherein neither of the electrodes are embedded in the ion absorbing layers.

The cell 10 may be used for example to remove nitrate ions from water; operation of the cell 10 will be described in relation to this use.

In this case the layer 14 comprises a weak anion exchange resin. In operation, a solution of nitrate ions, for example calcium nitrate of concentration 1 mM, is passed into the solution compartment 12 via inlet 24 and passes out of the cell through outlet 25; whilst inside the cell it is in contact with the front surface 16 of the membrane 14 and the counter electrode 26. A potential difference is applied between the electrode current feeder 13 (as anode) and the counter electrode 26 (as cathode) such that hydrogen ions are generated at the electrode current feeder 13 and move towards the counter electrode 26; on doing so they interact with and activate the anion exchange material within the layer 14. The nitrate ions present in the solution move towards and into the layer 14 where they are adsorbed onto the activated ion exchange material. The adsorbed nitrate ions move over a period of time, under the influence of the applied field, towards the rear surface 17 of the layer 14 and more nitrate ions are adsorbed at the front surface of the layer 14; the concentration of nitrate ions increases in the layer 14. In addition water from the solution permeates the layer 14 and flows towards the rear surface 17; if the flow of eluate out of the port 19 is totally unrestricted the permeation rate is typically 60 liters $m^{-2}h^{-1}$ for a layer 14 which is 5 mm thick. This water transportation may also be partially due to an electroosmotic effect wherein water of hydration moves with the nitrate ions as they move.

At an appropriate point, the elution port 19 may be opened to allow the permeating water and adsorbed nitrate ions to flow out of the cell 10. The concentration of nitrate ions in the eluate which emerges through this port 19 can be considerably higher than that of the solution undergoing treatment, and can for example be as much as 0.5M, this upper limit being set by the possibility of back-diffusion of concentrated solution from the rear of the layer 14 to the front. The port 19 may be closed initially, in order to allow the concentration of nitrate ions to build up in the layer 14 before removal. Once the ion exchange capacity of the layer 14 is reached, a concentrated solution of nitrate ions in the form of nitric acid emerges from the port 19, the rate of adsorption of ions from the feed solution will equal the rate of elution of ions into the eluate, the cell will be in a steady state, and the concentration of the eluate is determined by the rate at which eluate is allowed to flow out of the port 19. If there is a build up of gases due to electrolysis of the solution then the vent 18 may be opened to remove the gas. It will be appreciated that this process leads to a slight increase in the pH of the feed solution, as the calcium nitrate is converted to calcium hydroxide. Such a cell 10 has been operated continuously for a period of 6 months, producing 0.35M nitric acid.

Referring now to FIG. 2 there is shown an electrochemical cell 30 comprising an electrode assembly 11 identical to that of FIG. 1, and an electrode assembly 31, spaced apart by a dividing section 32. The assembly 31 has an electrode current feeder 36 embedded in a layer 34 of ion absorbing material, with an electrode contact 39, and differs from the assembly 11 only in that, whereas the layer 14 comprises an anion exchange material, the layer 34 comprises a cation exchange material. As with the layer 14, the layer 34 is permeable, being made of a mixture of a particulate material and an elastomeric binder. The dividing section 32 has an inlet port 33 and an outlet port 35. All three sections 11, 31 and 32 define a solution compartment 37.

Example 2

The cell 30 may be used to remove both anions and cations from a feed solution. Its operation will be described in relation to treatment of a sodium nitrate solution.

In operation of the cell 30 a solution of sodium nitrate, for example of 0.01M, is caused to flow through the solution compartment 37 (via the inlet 33 and outlet 35) and a potential difference is applied between the electrodes 20 and 39 such that the current feeder 13 is an anode and the current feeder 36 is a cathode. The layers 14 and 34 are activated by the appropriate electrode reactions and are able to adsorb the nitrate and sodium ions, respectively, from the solution. In addition water passes through each layer 14 and 34 during operation. Concentrated solutions of nitric acid and of sodium hydroxide are removed from the cell 30, emerging through the ports 19 of the assemblies 11 and 31 respectively, in the same manner as described for the cell 10 of FIG. 1. It has been found possible to generate continuously eluate streams containing 0.5M nitric acid and 0.7M sodium hydroxide.

Referring now to FIG. 3 there is shown an electrochemical cell 50 which comprises two electrode assemblies 51 and 52, and a dividing section 53, a solution compartment 56 being defined by the section 53 and opposed faces of the assemblies 51 and 52. Each electrode assembly comprises a housing 55 and a respective 8 mm thick permeable sheet or layer 54, 64 of ion absorbing material sealed around its edges by a gasket 57 to the housing 55 to define an elution compartment 58 between the housing 55 and the rear surface of the layer 54, 64. The layer 54 comprises particulate anion exchange material and a binder, while the layer 64 comprises particulate cation exchange material and a binder. Each housing 55 defines an outlet 61 and a vent 69 for the elution compartment 58, and an iridium/tantalum oxide-coated titanium electrode 62, 63 locates in this compartment 58 and has an electrode contact 59. The dividing section 53 defines an inlet 65 and an outlet 66 and supports a counter electrode 67 with an electrode contact 68.

The cell 50 is operated in a similar fashion to that described above in relation to the cell 30 of FIG. 2. The solution to be treated is caused to flow through the solution compartment 56 via the inlet 65 and outlet 66. The elution compartment 58 may be primed with water or an electrolyte before the cell 50 is operated, or may be filled by solution permeating through the layers 54, 64 from the compartment 56. The electrode contacts 59 are connected to a power supply (not shown) such that the electrode 62 is an anode, and the electrode 63 is a cathode. The counter electrode 67 may be electrically isolated, so it floats at a potential between those of the anode and cathode; alternatively it may be connected to an intermediate terminal on the power supply, and in this case the current supplied to the anode may differ from that supplied to the cathode.

Once dynamic equilibrium has been achieved the anions removed from the feed solution emerge as an acidic eluate through the outlet 61 from behind the anionic exchanger layer 54, and the cations removed from the feed solution emerge as an alkaline eluate through the outlet 61 from behind the cationic exchanger layer 64. The rate of removal of ions depends on the current density through the corresponding ion exchanger layer 54, 64; while the volume reduction factor depends on the rate of removal of eluate and the rate of flow of solution through the compartment 56, being approximately equal to the ratio of solution flow to eluate flow. The flow rates may be controlled by respective valves and pumps. The current efficiency (ions transferred per unit charge) increases with increasing solution flow rate, possibly due to increasing turbulence.

In the cell 50 the counter electrode 67 acts as part of the current path, and water is electrolysed at both its faces, generating hydroxyl ions at the face nearest the anionic exchanger layer 54 and hydrogen ions at the face nearest the cationic exchanger layer 64. The presence of the electrode 67 hence reduces the current efficiency of the cell 50 because of competition between the hydroxyl and hydrogen ions and the anions and cations from the solution, but the electrode 67 lowers the resistance of the cell 50 as it can be shaped to be close to both sides of the compartment 56, so the predominant resistance is that of the ion exchanger layers 54, 64. If the electrode 67 is omitted, then the cell 50 would operate in a very similar fashion to that of FIG. 2.

The above discussion relates to the removal of most anions (such as nitrate, sulphate, phosphate, iodide, chloride etc.), or to the removal of cations whose hydroxides are soluble (such as caesium or sodium). In all these cases the selectivity of the process tends to be governed by the rates of migration of the ions present through the solution. The discussion also relates to the removal of cations with sparingly soluble hydroxides from a feed solution. For example calcium hydroxide is saturated at a concentration of 16 mM; as long as the flow rate of the cationic eluate is such that the calcium concentration remains below 16 mM the process can operate continuously as described.

Example 3

A cell of the invention may be used to separate cations with an insoluble hydroxide from those with a soluble hydroxide. This will be described with reference to the cell 10 of FIG. 1. In this case the layer 14 would comprise a weak cation-exchange resin (such as IRC 50), and the current feeder 13 would be a cathode.

If a feed solution containing for example sodium and cobalt ions is supplied to the compartment 12, both sodium and cobalt ions pass into and are stored in the layer 14. The sodium ions emerge to form sodium hydroxide in the eluate compartment 23. Cobalt hydroxide is insoluble, so the cobalt ions remain in the layer 14, and gradually build up in concentration. As the ion exchange capacity of the resin is exceeded the presence of cobalt becomes apparent as a dark staining of cobalt hydroxide, but the rates of absorption of sodium and cobalt and the rate of transfer of sodium are unaffected by this build-up of cobalt. In one experiment the stored cobalt was equivalent to over 150% of the exchange capacity of the ion exchange material in the layer 14; the cobalt may be partly bound to the resin and partly in the form of hydroxide in the pores of the layer 14.

The cobalt can then be removed from layer 14 by supplying 0.1M dilute nitric acid to the solution compartment 12, filling the eluate compartment 23 with 0.1M dilute nitric acid, and applying a voltage to the cell 10 in the normal way. The cobalt ions are then eluted to form cobalt nitrate solution (about 0.1M). This process has been found to provide volume reduction factors for cobalt in excess of 2000.

Example 4

A cell of the invention may be used to separate ionic species by an in situ precipitation process. This will be described with reference to the cell 50 of FIG. 3.

It is desired to remove radium ions from a solution containing other ions such as sodium and calcium. In this case the cationic layer 54 is made of particulate barium sulphate (and a binder). The radium ions are trapped in the layer 54, forming radium sulphate (which is very insoluble) and displacing barium ions. All the other cations pass through the layer 54 unaffected. No radium could be detected in the cationic eluate.

Example 5

Using a modification of the cell 50 of FIG. 3 it is possible to remove arsenate ions $H_2AsO_4^-$ from a solution containing other anions such as bicarbonate and sulphate at much higher concentrations.

Figure 4:
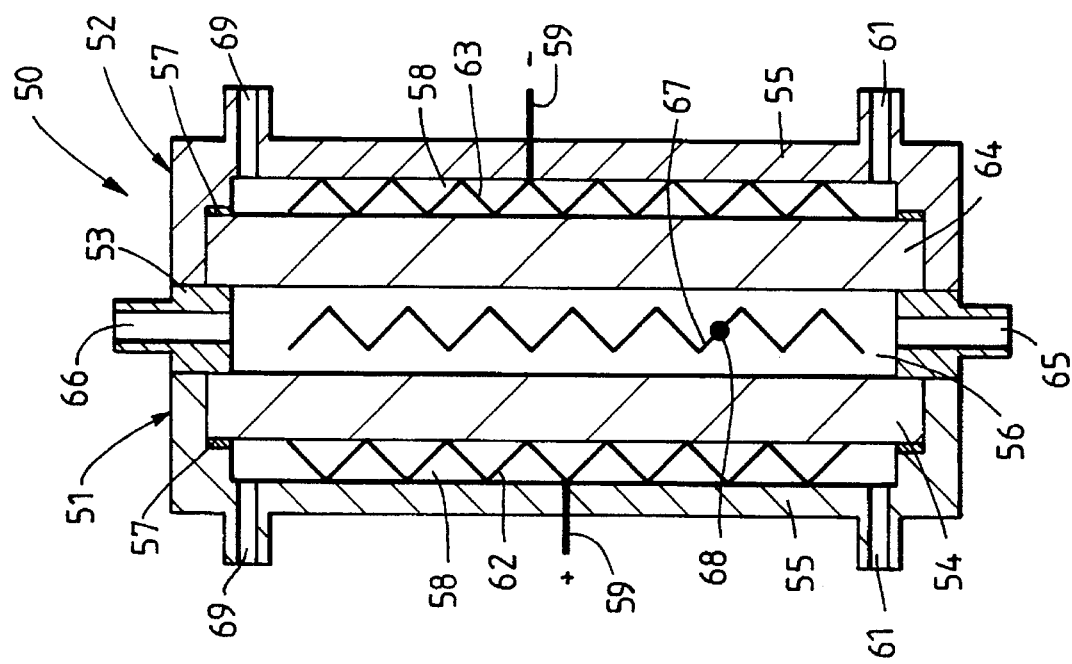
FIG. 4 shows a sectional view of an alternative electrochemical cell containing ion exchange beads.

Referring to FIG. 4 an electrochemical cell 60 comprises an electrode assembly 52 and a dividing section 53 identical to those in the cell 50, and an electrode assembly 71 which differs from the electrode assembly 51 in providing a wider elution compartment 72 provided with an inlet 73 and an outlet 74 for a liquid undergoing treatment. No electrode is provided in the solution compartment 56 between the faces of the layers 54, 64. The compartment 72 is filled with a readily permeable bed of 1 mm diameter beads 75 (only some of which are shown) of amino-phosphonic acid cation-exchange resin onto which lanthanum ions ($La^{3+}$) have been absorbed. The liquid therefore contacts the surface of substantially every bead 75.

The cell 60 is operated in two alternating phases. In the first phase the liquid to be treated is supplied to the inlet 73 to flow through the compartment 72; no power supply is connected to the contacts 59. Arsenate ions are selectively absorbed by the beads 75 (whose absorption sites mimic insoluble salts of arsenic acid). Bicarbonate ions are also absorbed, as too are sulphate ions to a limited extent, while chloride ions and nitrate ions pass through substantially unaffected. After a period of operation (for example 12 hours) the absorptive capacity of the beads 75 will be exhausted.

The cell 60 is then operated in a regeneration phase, in which a power supply is connected to the contacts 59 so that the electrode 62 is an anode and the electrode 63 a cathode, and the liquid undergoing treatment is supplied to the inlet 65 to flow through the solution compartment 56. Substantially all the ions are removed from the liquid, in the manner described in Example 2, forming an alkaline solution in the elution compartment 58, while an acid solution is formed in the elution compartment 72. The decrease in pH causes the arsenate ions to be desorbed from the beads 75, along with the bicarbonate ions (which break down to generate carbon dioxide gas bubbles). When the pH has decreased to about pH2, water is supplied through the inlet 73 so a solution of (inter alia) arsenic acid emerges from the outlet 74. This can be precipitated as copper arsenate ($Cu_3(AsO_4)_2$), by the addition of copper sulphate or by generating copper ions electrolytically.

The ion exchange beads 75 might be replaced with beads of a cationic resin onto which a different lanthanide ion is absorbed, or onto which ferric ions are absorbed. A further alternative would use copper ions absorbed on Dow 2N (pyridyl tertiary ammonium groups). An alternative ion exchange material is zirconia (hydrous zirconium oxide), which may be used in the form of granules. Such granules, which may be about 1 or 2 mm across, may be made by mixing zirconia with an elastomeric binder, allowing the mixture to set, and then breaking it up into granules. In a modification the highly porous packed bed of beads 75 (or of granules) may be bonded into a highly porous but coherent structure by use of an elastomeric binder.

Zirconia absorbs arsenate ions very strongly, so that if a cell 60 containing zirconia is eluted as described above, lowering the pH to about 2, then the other absorbed anions will be desorbed and eluted preferentially, leaving the arsenate ions absorbed. The absorption operation (phase one) can be repeated, and the regeneration/elution operation (phase two), several times until a significant proportion of absorbing sites are occupied by arsenate ions. The arsenate can then be removed by carrying out the second phase long enough to lower the pH to less than pH1, or alternatively the zirconia might be regenerated chemically.

If the solution to be treated by the cell 60 also contains chloride ions it is desirable to separate the beads 75 from the anode 62 by a cation electrodialysis membrane, to prevent formation of chlorine during the electrolysis (regeneration) periods. If the solution to be treated contains bicarbonate ions as well as arsenate ions, the absorption of the former can be suppressed by supplying the solution to the cell 60 at a pH less than 7, possibly as low as about 4, so the bicarbonate ions form uncharged carbonic acid. This may be achieved by passing the solution through a pretreatment cell (not shown) in which an anode is separated from a cathode by a layer 64 of cation exchange material (as in FIG. 3). The solution is passed through the anode compartment of the pretreatment cell, so its pH is reduced to between pH 6.5 and 5, for example pH5; it is then passed through the cell 60 as described above; and it is then passed through the cathode compartment of the pretreatment cell so the pH is returned to about pH7. If the solution also contains arsenite ions ($AsO_2^-$) these are also found to be absorbed by the zirconia, even in the pH range 5–6; at lower values of pH the arsenite ions are eluted more readily than arsenate ions.

In the cell 60 the selectivity with which arsenate ions are trapped and removed from the water is determined by the selectivity of the ion exchange material of the beads 75 because of the large surface area to which the water is exposed. This type of cell can therefore be more selective than the cells 10, 30, 50 discussed earlier. The cell 60 can also be used in exactly the same way to remove selenium in the form of selenites or selenates from water.

Figure 5:
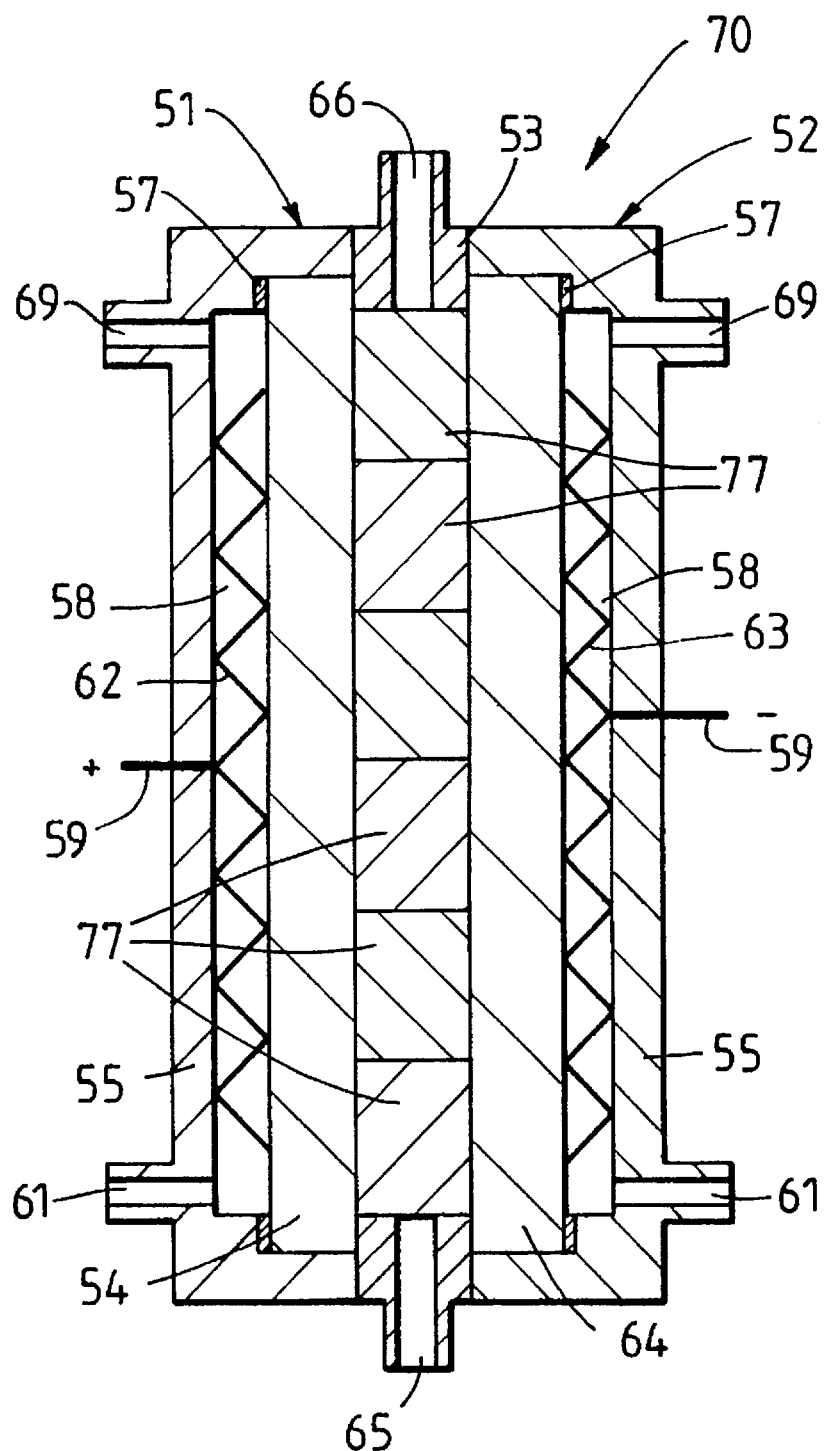
FIG. 5 shows a sectional view of an alternative electrochemical cell in which the solution compartment contains a foam.

An alternative modification to the cell 50 of FIG. 3 is shown in FIG. 5, to which reference is now made, which shows a cell 70 differing from the cell 50 in that no electrode is provided within the solution compartment 56, and in that the compartment 56 is filled with blocks 77 of low-density high-porosity ion exchanger foam. (Such blocks 77 could equally be used in the compartment 56 of the cell 60). The blocks 77 may be made from a polyurethane gas filter foam of density about 25 kg $m^{-3}$, coating the walls of the pores with an ion exchanger material by dipping it into a slurry of particulate ion exchanger in a solution of binder in a suitable solvent. This may be repeated to build up multiple coats; exchanger/foam densities of 400 kg $m^{-3}$ have been achieved. The foam is then swollen by soaking in water for about an hour. The compartment 56 is then filled with a stack of blocks 77 of ion exchanger foam, each block 77 occupying the entire width of the compartment 56 between the layers 54 and 64, each block 77 incorporating a single type of ion exchanger. In this example the type of ion exchanger is alternately cationic and then anionic up the stack (in the flow direction), there being six such blocks 77, three with cationic and three with anionic exchange materials. The foam blocks 77 are readily permeable to the liquid to be treated, and enable the selectivity for removal of ions from the liquid to be enhanced.

Such a cell 70 may be used to generate deionised water: the conductivity of tap water has been reduced to 40 µS $m^{-1}$ on passage through such a cell 70 with just two foam blocks 77. Ions are trapped by the ion exchange material in the foam; hydrogen ions diffuse through the layer 54 from the anode 62 and hydroxide ions diffuse through the layer 64 from the cathode 63. These hydrogen and hydroxide ions elute trapped cations and anions respectively, which migrate to (and through) the layers 64 and 54 respectively.

The electrical resistance of such a cell 70 may be reduced, as discussed earlier, by providing a counter electrode along the centre of the compartment 56. In this case, all the ion exchanger foam between the counter electrode and an ion exchanger layer would be of the same type (cationic or anionic) as that layer. If the electrode polarities are unchanged then hydrogen and hydroxide ions are generated at the surfaces of the counter electrode facing the cationic and anionic layers 64 and 54 respectively.

Example 6

Where it is only desired to remove cations from a liquid stream, all the foam blocks 77 in the cell 70 would incorporate a cation exchange material. For example the cell 70 may be used to remove caesium ions selectively from a liquid stream containing sodium ions at a higher concentration, using blocks 77 containing a resorcinol formaldehyde resin which absorbs caesium preferentially. In this case the cell 70 may be operated in two alternating phases, though in each phase the liquid stream is passed through the flow compartment 56 and so through the blocks 77. In the first phase no power supply is connected to the contacts 59, and caesium ions are absorbed selectively until the absorptive ion-exchange capacity of the blocks 77 is exhausted. In the other phase the power supply is connected to the contacts 59 so that caesium ions (and some sodium ions) migrate through the blocks 77 and through the layer 64 to emerge as an alkaline solution in the elution compartment 58.

Example 7

In an alternative example all the foam blocks 77 in the cell 70 incorporate a selective chelating ion-exchange resin (such as IRC 718) which selectively absorbs transition metals. This may be used to remove cadmium from a liquid stream containing sodium. It may be operated in two alternating phases as in Example 6, or with the power supply continuously connected; but in either case, because cadmium hydroxide is not readily soluble the cadmium ions will gradually build up in concentration in the cationic exchange layer 64 (as in Example 3).

In both Examples 6 and 7 the cell 70 is only required to remove cations from the liquid stream, and in such a case both the layers 54 and 64 may comprise cation exchange material. One or both of the layers 54 and 64 may be replaced by electrodialysis membranes, although in this case a separate liquid supply is needed to the respective compartments 58. For example in Example 7 the layer 64 might be replaced by a cationic electrodialysis membrane; and nitric acid be injected into the compartment 58 behind it, so that the cadmium ions elute into this acidic electrolyte.

Example 8

It will also be appreciated that if it is desired to remove only anions from a liquid, such as a liquid stream at pH6 containing unionised boric acid (500 ppm) and sulphate ions (15 ppm) from which the sulphate ions are to be removed, the cell 70 might have both the layers 54 and 64 comprising anion exchange material, and all the foam blocks 77 also comprising anion exchange material such as PrAOH, Puralite strong base resin).

In the cell 70 of FIG. 5 the flow compartment 56 ms occupied by blocks 77 of foam. These blocks 77 provide a continuous ion-exchanger path across the compartment 56 and also provide a large surface area to be contacted by the liquid. The blocks 77 might be replaced by a stack of sheets of particulate ion exchange material with a binder, as used in the layer 54 or 64, but with ridged surfaces so as to define flow channels between the sheets. Such sheets might be made by a hot-pressing process. Alternatively the foam blocks 77 might be replaced by a high porosity fibrous structure; such a structure can be made by spraying a thin jet of a mixture of particulate ion exchanger, binder, and solvent onto a plastic mesh substrate, the jet drying just as it reaches the substrate, so as to form a web of fibres. The fibres may be of diameter about 0.1 mm, and the web may be about 1 mm thick. Such a web might also be made on the other surface of the mesh. The mesh and webs are then cut into rectangular strips the width of the compartment 56 and stacked on top of each other in the compartment 56.

Example 9

A feed liquid containing 10 ppm cobalt and 50 ppm sodium ions has been treated by passing it through three cells based on the cell 70 of FIG. 5, but in which both the layers 54 and 64 comprise a strong acid ion-exchange resin (PrCH resin). In cell A the flow compartment 56 was empty; in cell B the compartment 56 contained foam blocks 77 all containing PrCH resin; while in cell C the foam blocks 77 were replaced by a stack of fibrous webs containing PrCH resin. The concentrations of sodium and cobalt in the treated liquid were as follows:

| cell A | 9.58 ppm Co | 44 ppm Na |
| cell B | 1.58 ppm Co | 12.5 ppm Na |
| cell C | 0.58 ppm Co | 11.2 ppm Na |

Figure 6:
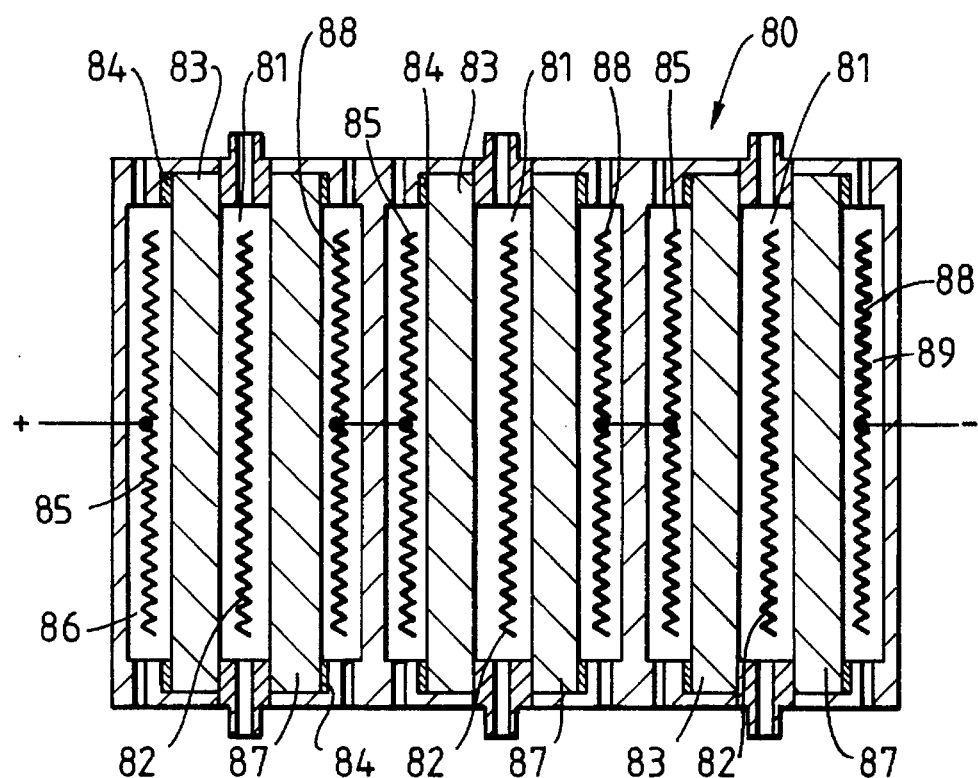
FIG. 6 shows a sectional view of a stack of cells similar to those of FIG. 3.

A plurality of cells, for example of the type shown in FIG. 3, may be arranged in series with the anode of one cell connected to the cathode of the next. Such an arrangement is shown diagrammatically in FIG. 6 to which reference is now made. The cell stack 80 of FIG. 6 includes three flow channels 81 for a liquid undergoing treatment, each with an inlet and an outlet, and an electrically isolated mesh electrode 82. To the left (as shown) of each flow channel 81 is a permeable layer 83 of anion exchanger material (sealed by a gasket 84) behind which is an electrode 85 in an anolyte compartment 86 with a gas vent and an outlet duct. To the right of each channel 81 is a similar layer 87 of cation exchanger material, behind which is an electrode 88 in a catholyte compartment 89. At the ends of the stack 80 the electrodes are connected to a power supply (not shown), while the intermediate anodes 85 and cathodes 88 are interconnected in pairs. The stack 80 operates in substantially the same way as the cell 50 of FIG. 3.

Figure 7:
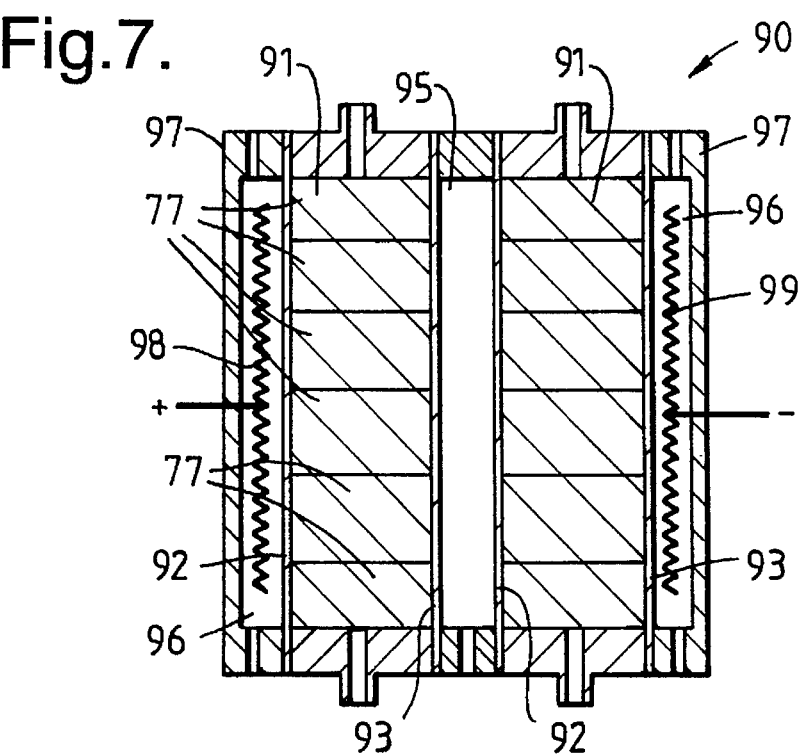
FIG. 7 shows a sectional view of two cells in which the solution compartment contains a foam.

Referring now to FIG. 7, an alternative cell 90 is shown which includes two flow channels 91 for a liquid undergoing treatment, each with an inlet and an outlet. Each channel 91 is defined between two electrodialysis membranes, an anion-selective membrane 92 to the left (as shown) and a cation-selective membrane 93 to the right, and each channel 91 is filled with a stack of blocks 77 of very high permeability ion exchanger foam as described earlier. As discussed above, the type of ion exchanger in each block 77 might be alternately cationic and anionic up the stack (in the flow direction). The permeability is such that for a channel 91 of cross-section 1 cm by 5 cm, and of height 16 cm, the flow rate is 60 liter/hr for a pressure difference of ¼ atm. An eluate chamber 95 between the two channels 91 is bounded by the two membranes 92 and 93 and defines a concentrate outlet; eluate chambers 96 outside the two channels 91 are defined between a membrane 92 or 93 and a housing 97, enclose electrodes 98 and 99, and define eluate outlets and gas vents.

The cell 90 may be used to deionise water. In operation a power supply (not shown) is applied to the electrodes 98 and 99 to attract anions in the water towards the anion selective electrodialysis membranes 92. Any ions in the water are effectively trapped as they permeate the highly porous blocks 77 of foam. The electric field then causes the ions to migrate through the block 77 and through the appropriate membrane 92 or 93 into either the eluate chamber 95 (from which a neutral concentrate emerges) or into one or other of the eluate chambers 96.

Example 10

Cells of the invention may also be used in a context where there is no bulk flow of liquid, for example in the case of cathodic protection of reinforcing bars in concrete, to ensure that acid generated near the anode does not affect the concrete.

Figure 8:
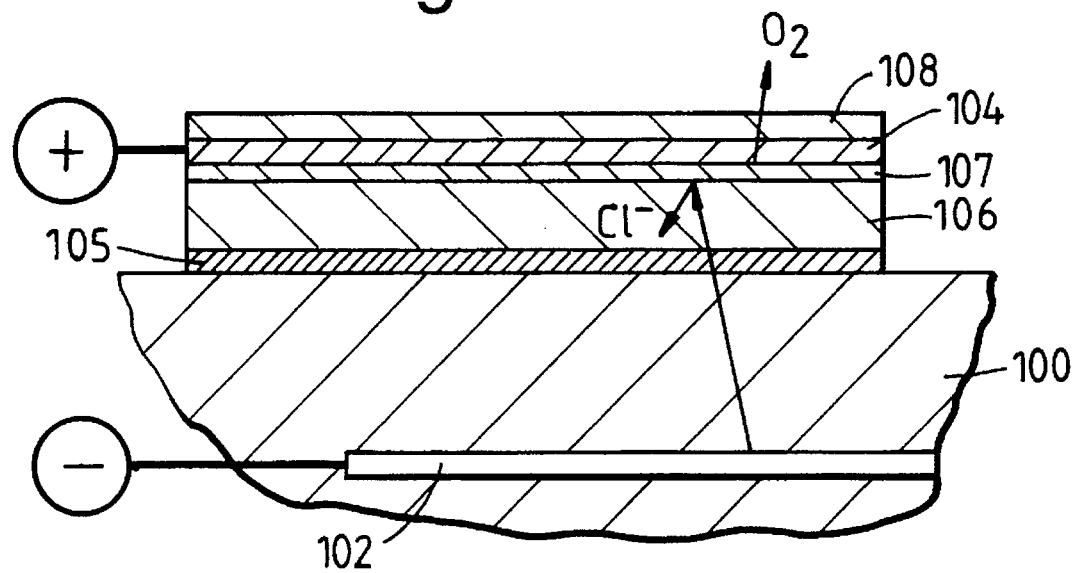
FIG. 8 shows a sectional view of a cathodic protection cell for concrete.

Referring to FIG. 8 a concrete structure 100 is shown in which is a reinforcing bar 102. An external power supply (not shown) makes the bar 102 cathodic, and an external anodic electrode 104 is provided at the surface of the concrete. The electrode 104 is a mesh of manganese dioxide-coated electrically-conductive titania and is spaced apart from the concrete surface by a permeable layer 106 of particulate anionic exchange resin initially in the -OH form, and a binder, about 10 mm thick, with a thinner layer 107 of particulate strong-acid cationic exchange resin and a binder, about 1 mm thick, above it. Above the electrode 104 is a gas-permeable protective layer 108 of non-woven polyethene mesh. The layer 106 is stuck to the concrete surface with polyvinyl alcohol (PVA) 105, cross-linked in situ.

In operation, chloride ions are attracted towards the anodic electrode 104 and displace hydroxide ions from the layer 106. The layer 107 repels chloride ions, so no chlorine is generated at the anode (chlorine production being further suppressed by the electrode material), and the chloride ions are therefore trapped in the layer 106. At the electrode 104 the displaced hydroxide ions neutralize the hydrogen ions generated by electrolysis of water.

Figure 9:
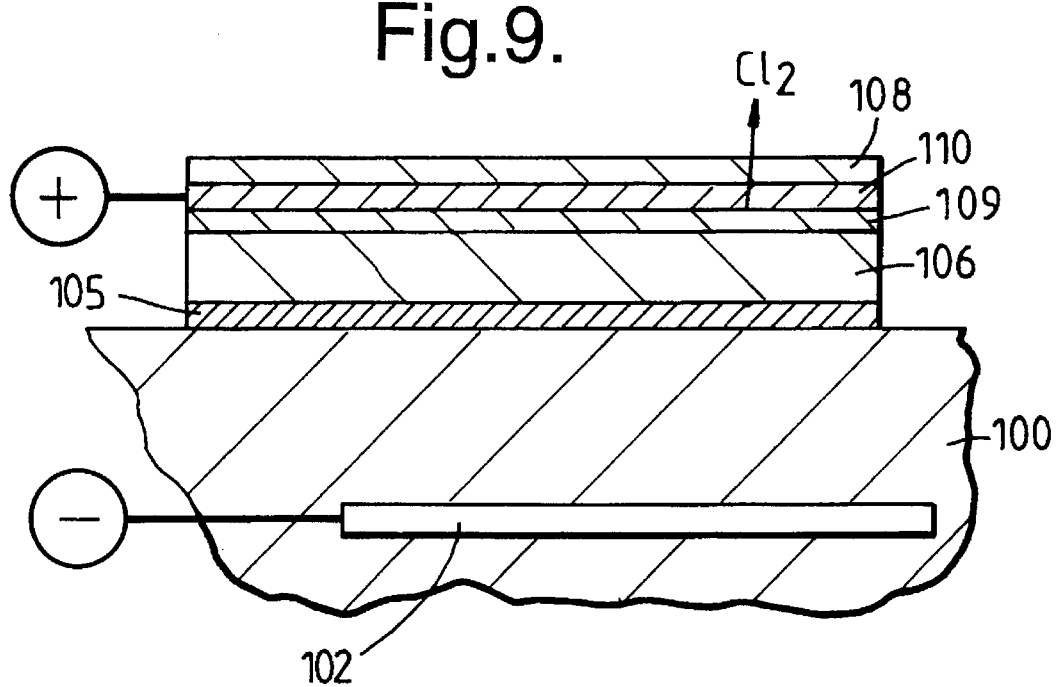
FIG. 9 shows a sectional view of a modification of the cell of FIG. 8.

An alternative approach is shown in FIG. 9, where it is desired to discharge chlorine into the atmosphere rather than to store it; identical components are referred to by the same reference numbers. In this case no cationic ion exchange layer is provided; instead there is a polytetrafluoroethene (PTFE)/zirconia layer 109 to protect the anionic exchange layer 106 from oxidation; and the anodic electrode 110 is one which favours chlorine evolution, such as conductive titania coated with ruthenium oxide.

The layers 106, 107 and 109 may be made by a hot pressing process. Ion exchange material, ground down to a desired size (e.g. 100 μm), is mixed with a binder in a solvent so all the particles are coated. The solvent is allowed to evaporate, and the material is ground to break up any lumps. The particulate material is then hot pressed (at 80°–85° C.) to give the desired permeable layer.

We claim:

1. An electrochemical cell for use in electrochemical deionisation which comprises a water-permeable layer of particulate ion absorbing material, a liquid compartment for a liquid undergoing treatment arranged so the liquid comes into contact with at least part of the layer, electrodes to apply an electric field across at least part of the layer, so that ions move through the layer to emerge into an eluate zone, the layer being at least 1 mm thick in the direction of the electric field, and the particulate material being bound together by a binder so as to be coherent at least in the direction of the electric field, and means to ensure separation of the liquid undergoing treatment from the eluate zone.

2. A cell as claimed in claim 1 wherein the liquid compartment is bounded by two such separation means which separate the liquid undergoing treatment from respective eluate zones.

3. A cell as claimed in claim 2 wherein each separation means comprises a respective said layer, each said layer having a front surface exposed to the liquid compartment and a rear surface exposed to the respective eluate zone.

4. A cell as claimed in claim 2 wherein the layer is highly permeable to the liquid, and wherein each separation means comprises a barrier layer of particulate ion absorbing material bound into a water-permeable coherent structure by a binder and at least 1 mm thick.

5. A cell as claimed in claim 4 wherein the layer occupies the width of the liquid compartment.

6. A cell as claimed in claim 2 wherein each layer is highly permeable to the liquid, and wherein each separation means comprises an electrodialysis membrane.

7. A cell as claimed in claims 6 wherein the layer occupies the width of the liquid compartment.

8. A cell as claimed in claim 1 wherein the separation means comprises a said layer, the said layer having a front surface exposed to the liquid compartment and a rear surface exposed to the eluate zone.

9. A cell as claimed in claim 1 wherein the layer is highly permeable to the liquid, and wherein the separation means comprises a barrier layer of particulate ion absorbing material bound into a water-permeable coherent structure by a binder and at least 1 mm thick.

10. A cell as claimed in claim 1 wherein the layer is highly permeable to the liquid, and wherein the separation means comprises an electrodialysis membrane.

11. A cell as claimed in claim 1 wherein the layer comprises a plurality of macroporous foam blocks incorporating particulate ion absorbing material.

12. A cell as claimed in claim 11 wherein some of the foam blocks incorporate an anion absorbing material and the other foam blocks incorporate a cation absorbing material.

13. A cell as claimed in claim 1 wherein the layer comprises a high porosity fibrous structure, the fibres incorporating particulate ion absorbing material.

14. A method for the removal of ions from an aqueous liquid which comprises establishing an electrochemical cell by causing the aqueous liquid, as cell electrolyte, to be present in the liquid compartment of a cell as claimed in claim 1, and applying a d.c. voltage between the electrodes such that ions are adsorbed into the layer, are stored within the layer, are transported through the layer as a result of the electric field, and are subsequently eluted from the layer, being transported into the eluate zone.

15. A method as claimed in claim 14 wherein the separation means is water-permeable, and wherein water from the electrolyte passes through the separation means along with the transported ions, into the eluate zone, so producing in the eluate zone an eluate solution.

16. A method as claimed in claim 15 wherein an eluate zone of the cell contains an ion exchange material suitable for absorbing the ions, and wherein (a) in a first stage the aqueous liquid is caused to flow through the said eluate zone of the cell, with no d.c. voltage and so no electric field applied, and (b) then in a second stage an aqueous liquid is supplied to the liquid compartment and the d.c. voltage is applied, the eluate solution so produced in the eluate zone being such as to cause desorption of the ions absorbed on the ion exchange material.

17. A method as claimed in claim 14 wherein the layer is highly permeable to the liquid and occupies the width of the liquid compartment, the aqueous liquid is caused to flow through the liquid compartment, and wherein (a) in a first stage no d.c. voltage and so no electric field applied, and (b) then in a second stage the d.c. voltage is applied so ions absorbed in the layer are transported into the eluate zone.

\* \* \* \* \*